(12) United States Patent
Moodie et al.

(10) Patent No.: US 7,709,799 B2
(45) Date of Patent: May 4, 2010

(54) TERAHERTZ DETECTOR

(75) Inventors: David Graham Moodie, Suffolk (GB); Michael James Robertson, Ipswich (GB); Ian Douglas Henning, Suffolk (GB)

(73) Assignees: The Centre For Integrated Photonics Limited, Ipswich (GB); University of Essex, Colchester, Essex (GB)

( * ) Notice: Subject to any disclaimer, the term of this patent is extended or adjusted under 35 U.S.C. 154(b) by 122 days.

(21) Appl. No.: 11/914,788

(22) PCT Filed: May 18, 2006

(86) PCT No.: PCT/GB2006/001846

§ 371 (c)(1),
(2), (4) Date: Jul. 14, 2008

(87) PCT Pub. No.: WO2006/123162

PCT Pub. Date: Nov. 23, 2006

(65) Prior Publication Data

US 2009/0206262 A1 Aug. 20, 2009

(30) Foreign Application Priority Data

May 18, 2005 (GB) ................................ 0510112.6

(51) Int. Cl.
*G01J 5/02* (2006.01)
(52) U.S. Cl. ................................................. 250/341.1
(58) Field of Classification Search ............... 250/341.1
See application file for complete search history.

(56) References Cited

U.S. PATENT DOCUMENTS

2003/0178584 A1 9/2003 Arnone et al.
2004/0065831 A1* 4/2004 Federici et al. .......... 250/341.1
2004/0069984 A1* 4/2004 Estes et al. .................... 257/25

OTHER PUBLICATIONS

Sha W et al, "New Coherent Detector for Terahertz Radiation Based on Excitonic Electroabsorption", Applied Physics Letters, AIP, American Institute of Physics, vol. 61, No. 15, 1763-1765, Oct. 12, 1992.
Wu Y. et al., "Microwave Photonics Frequency-converted Link Using Electroabsorption Devices", Leos 2003 16$^{th}$ Annual Meeting of the IEEE Lasers & Electro-Optics Society, vol. 1 of 2, 867-868, Oct. 26, 2003.
Boyd G. D. et al., "Multiple Quantum Well Reflection Modulator", Applied Physics Letters, AIP, American Institute of Physics, vol. 50, No. 17, 1119-1121, Apr. 27, 1987.

* cited by examiner

*Primary Examiner*—David P Porta
*Assistant Examiner*—Marcus H Taningco
(74) *Attorney, Agent, or Firm*—Renner, Otto, Boisselle & Sklar, LLP

(57) ABSTRACT

A detector for electromagnetic radiation in the range 80 GHz to 4 THz comprises a laser light source (115) an optical modulator (13) arranged to modulate light from the laser light source (11) and a filter system (17) for selecting a defined range of frequencies of the modulated light. The optical modulator is an electroabsorption modulator (13) with an antenna (15) which is sensitive to electromagnetic radiation in the range 80 GHz to 4 THz. The signal received by the antenna (15) modulates the electric field across the electroabsorption modulator (13), whereby to modulate the light from the laser light source (11).

6 Claims, 2 Drawing Sheets

TERAHERTZ DETECTOR

This application is a national phase of International Application No. PCT/GB2006/001846 filed May 18, 2006 and published in the English language.

FIELD OF THE INVENTION

This invention relates to the detection of electromagnetic radiation in the 80 GHz to 4 THz range.

BACKGROUND TO THE INVENTION

The present invention relates to the detection of electromagnetic radiation in the 80 GHz to 4 THz range. This region of the electromagnetic spectrum has potential for a wide range of medical, pharmaceutical and communications commercial applications as well as being scientifically useful across a wide variety of research fields. Whilst THz systems have been constructed they generally use large and expensive pulsed lasers to generate pulsed THz radiation. While several techniques have been put forward for detecting THz radiation, such as electro-optic sampling, photoconductive sampling and use of bolometers, they are complicated by the need for the pulsed lasers and/or cryogenic cooling.

High speed electroabsorption effects have previously been used to detect THz radiation by W. Sha et al, (Appl. Phys. Lett. 61 (15), 12 Oct. 1992). In Sha et al's scheme the THz radiation was propagated directly onto the multiple quantum well absorber region of the THz detector. In Sha et al's scheme the optical probe signal was a train of 75 fs pulses focussed onto the sample using a lens from a direction perpendicular to the plane of the multiple quantum well absorber region.

In co-pending patent applications GB 0502108.4 and PCT/GB2006/000360, a novel means of extending the operating frequency of optical modulators was outlined and it was stated that such a device could be used to detect radiation in the frequency range 80 GHz to 2 THz. The present invention builds upon this idea by outlining, at least in the preferred embodiments, a promising approach for high sensitivity detection of radiation typically in the frequency range 80 GHz to 2 THz using a high bandwidth optical modulator.

SUMMARY OF THE INVENTION

Accordingly, this invention provides a detector for electromagnetic radiation in the range 80 GHz to 4 THz. The detector comprises a laser light source, an optical modulator arranged to modulate light from the laser light source, and a filter system for selecting a defined range of frequencies of the modulated light. The optical modulator comprises an electroabsorption modulator and an antenna which is sensitive to electromagnetic radiation in the range 80 GHz to 4 THz. The signal received by the antenna modulates the electric field across the electroabsorption modulator, whereby to modulate the light from the laser light source.

The high bandwidth (electroabsorption) modulator may be operated to impart phase modulation, intensity modulation or a combination of the two. In each case the device generates sidebands either side of the optical carrier frequency due to the high frequency modulation. Thus, the selected range of frequencies may correspond to a sideband of the laser light frequency in the spectrum of the modulated light. One or both of the generated optical sidebands may be selectively optically filtered and then detected after optional optical amplification.

The filter system may operate as a bandpass filter. In a preferred arrangement, however, the selected range of frequencies may be defined only by an upper or lower limit. In other words, the filter system may operate as a high pass filter, or preferably as low pass filter.

The filter system may comprise an optical filter, for example a thin film filter, and/or an electrical filter. The filter system may use the band edge of a semiconductor as a filter. In one possible arrangement, a further electroabsorption modulator is used in the filter system.

The preferred embodiment is to use a high bandwidth electroabsorption modulator connected to a high frequency antenna and a small DC reverse bias voltage. In this preferred embodiment the modulator does not need to be cryogenically cooled. The preferred approach used here is to use an antenna to apply the THz signal across the contacts of an electroabsorption modulator to achieve higher electric fields across the multiple quantum well absorber region due to the THz signal. The detection approaches outlined do not need pulsed lasers (although they may be compatible with them if required) and may use either fibre coupled devices or planar optical waveguides to transmit the optical signal between components to give a more compact system. Thus, the laser light source may be a continuous wave laser light source. Within the optical modulator light may propagate along the plane of the device to give a higher overlap of the optical and THz fields and consequently a stronger detected signal.

A high bandwidth modulator may be used to detect THz radiation by shining continuous wave light through it and then monitoring one of the high frequency sidebands on an optical spectrum analyser or through use of an optical filter, an optional optical amplifier and a low bandwidth photodiode.

If the amount of THz radiation coupled into the antenna is relatively low (for example approximately 1 µW) then a more sensitive detection approach is to heterodyne the optical signal emerging from the modulator with another optical wave. A balanced detector may then be used to enhance sensitivity.

Thus, the detector may comprise a second laser source of a different frequency to the first laser source. The light from the second laser source may be mixed with the modulated light from the first laser source to generate a beat frequency. The filter system may comprise at least one photodiode, or other suitable optical to electrical device, to convert an optical signal at the beat frequency to an electrical signal. The filter system may further comprise an electrical filter to select the electrical signal at the beat frequency.

Potentially, this detection scheme may offer higher signal to noise ratios than alternative approaches providing greater sensitivity. Lock in detection schemes may also give further benefit. In principle the scheme could also work with pulsed broadband THz signals.

Viewed from a broad aspect, the invention provides a system using high speed optical modulation to detect radiation in the microwave, mm-wave or THz range where continuous wave light is coupled into the device in which the modulation takes place.

Viewed from another broad aspect, the invention provides a high frequency detection system where one or other of optical intensity modulation, optical amplitude modulation, optical phase modulation or optical polarisation modulation is used to generate sidebands of the high frequency radiation to be detected. The generated optical sidebands may then be measured by photomixing with another optical wave. The second optical wave may have a different carrier wavelength to that of the first optical wave. The difference in carrier frequencies may be equal to the frequency of the incoming radiation plus some small difference frequency where the small difference frequency is set to less than the electrical filter bandwidth of the photodetector.

The optical modulation may be accomplished by electroabsorption. The optical modulation may be accomplished using a multiple quantum well absorber region. The optical modulation may be accomplished using an antenna to convert the high frequency radiation in a high frequency electrical field across the electrodes of the device. The optical modulation may be accomplished in a device where the optical signal is guided along the plane of the multiple quantum wells.

BRIEF DESCRIPTION OF THE DRAWINGS

An embodiment of the invention will now be described by way of example only and with reference to the accompanying drawings, in which.

DETAILED DESCRIPTION OF AN EMBODIMENT

Figure 1:
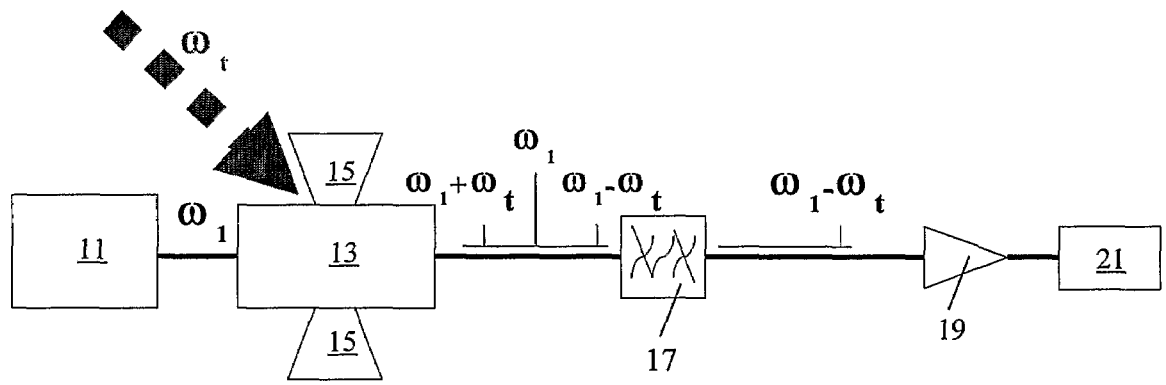
FIG. 1 shows a terahertz detector according to an embodiment of the invention based on modulation of a high speed modulator and then measurement of the optical sideband.

FIG. 1 shows a terahertz detector according to a first embodiment of the invention based on modulation of a high speed modulator and then measurement of the optical sideband. As shown in FIG. 1, continuous wave laser light from a laser 11 at frequency $\omega_1$ is modulated by an electroabsorption modulator 13 connected to an antenna 15. The high bandwidth modulator 13 is used to detect THz radiation ($\omega_t$) by shining continuous wave light through it and then monitoring one of the high frequency sidebands ($\omega_1+\omega_t$ or $\omega_1-\omega_t$) on an optical spectrum analyser or through use of an optical filter 17, an optional optical amplifier 19 and a low bandwidth photodiode 21.

Figure 2:
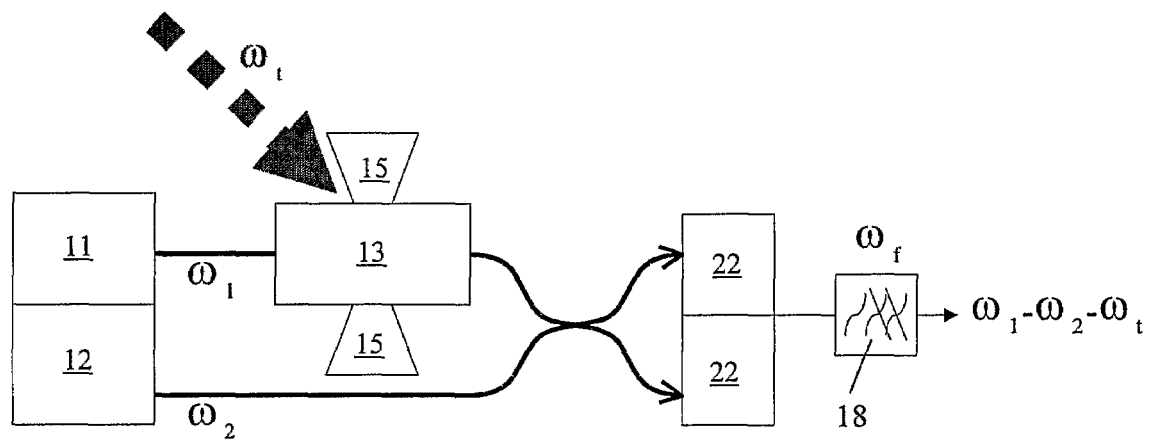
FIG. 2 shows a terahertz detector according to an embodiment of the invention based on a heterodyne detection scheme.

If the amount of THz radiation coupled into the antenna is relatively low (for example approximately 1 µW) then a more sensitive detection approach is to heterodyne the optical signal emerging from the modulator with another optical wave. A balanced detector may then be used to enhance sensitivity. Such an approach is shown in FIG. 2 and also described below. FIG. 2 shows a terahertz detector according to an embodiment of the invention based on a heterodyne detection scheme. As shown in FIG. 2, continuous wave laser light from a first tuneable laser 11 at frequency $\omega_1$ is modulated by an electroabsorption modulator 13 connected to an antenna 15. The modulated light is photomixed with laser light from a second tuneable laser 12 at frequency $\omega_2$ which generates beat frequencies. The beat frequencies are converted to corresponding electrical signals by balanced photodiodes 22 and are filtered by a low pass electrical filter 18 of bandwidth $\omega_f$ to obtain the lowest beat frequency ($\omega_1-\omega_t-\omega_2$). The frequency $\omega_2$ of the light from the second tuneable laser 12 is selected such that $\omega_1-\omega_t-\omega_2<\omega_f$. The arrangement of FIG. 2 has the advantage that coherent optical gain can be achieved and a fine frequency resolution is possible, as the filtering is done in the electrical domain. The configuration of the preferred embodiment is shown in FIG. 2.

The modulator is assumed to impart predominantly intensity modulation such that the optical power and electric field of the modulated light are given by equations 1 and 2 respectively.

$$P(t)=P_1[1+m\cos\overline{\omega}_1 t] \tag{1}$$

$$E(t)=E_1[1+m\cos\overline{\omega}_1 t]^{1/2}\cos\overline{\omega}_1 t \tag{2}$$

The strength of modulation under a modulating voltage $V=V_0+V_p\cos\omega_t t$ is given by equation 3 where T is the linear transmission of the modulator and $R_{\omega_t}$ is the response of the modulator at an angular frequency $\omega_t$ relative to its low frequency value.

$$m=\frac{1}{T_0}\frac{dT}{dV}\bigg|_{V_0} V_p\sqrt{R_{\overline{\omega}_t}} \tag{3}$$

The sensitivity is enhanced by increasing the output power of the second tuneable laser 12 SO that the detectors of responsivity R are Shot noise limited. In that limit the signal to noise ratio is approximated by equation 4 where e is the electronic charge and Δf is the noise bandwidth which may be defined by the electrical filter bandwidth.

$$\frac{S}{N}\approx\frac{m^2 P_1 R}{4e\Delta f} \tag{4}$$

Example 1

If the DC transfer characteristics are similar to an existing modulator design $((dT/dV)^2)/T_0\sim 0.5)$ and the power out of laser 1 is 10 mW, then assuming representative values of $R_{\omega_t}\sim 0.01$, $V_p\sim 0.01$V (corresponding to a 1 µW absorbed THz radiation in a 50Ω antenna), R~0.8 A/W and Δf~50 MHz then the expected S/N ratio is approximately 21 dB.

Example 2

Sensitivity can be greatly improved through use of a narrower electrical filter to reduce Δf if the laser wavelengths can be controlled with enough precision and their linewidths are narrow enough.

For example if the laser was sufficiently stable and narrow linewidth to permit operation with a 1 kHz electrical filter (to allow sampling at up to 1 kHz) then if the same parameters as in Example 1 are used the expected S/N ratio is approximately 68 dB. This S/N ratio and sample rate are thought to exceed current state of the art systems.

In summary, a detector for electromagnetic radiation in the range 80 GHz to 4 THz comprises a laser light source 11, an optical modulator 13 arranged to modulate light from the laser light source 11 and a filter system 17 for selecting a defined range of frequencies of the modulated light. The optical modulator is an electroabsorption modulator 13 with an antenna 15 which is sensitive to electromagnetic radiation in the range 80 GHz to 4 THz. The signal received by the antenna 15 modulates the electric field across the electroabsorption modulator 13, whereby to modulate the light from the laser light source 11.

Disclosure of Related Applications GB 0502108.4 and PCT/GB2006/000360

In UK patent application 0502108.4 and International Patent Application PCT/GB2006/000360, there is described an electroabsorption modulator comprising an absorption layer between two layers of n-doped semiconductor, wherein the absorption layer is doped or implanted with ions making it semi-insulating. In some embodiments, intermediate layers of p-type semiconductor may be located between the absorption layer and each layer of n-type semiconductor. In general, the absorption layer is Fe-doped, although other deep level acceptor dopants may be used. For example, the absorption layer may be doped with other transition metals. The dopant concentration in the absorption layer may be greater than $2\times10^{16}$ cm$^{-3}$, in particular greater than $2\times10^{17}$ cm$^{-3}$. In most embodiments, the dopant concentration is no greater than $2\times10^{18}$ cm$^{-3}$. The device may be fabricated upon a semi-insulating InP substrate. The device may use a travelling wave electrode structure.

Other aspects of the invention disclosed in GB 0502108.4 and PCT/GB2006/000360 are:

an electroabsorption modulator in which the layer or layers whose absorption coefficient can be modulated by an electric field is doped or implanted with ions making it semi-insulating.

an electroabsorption modulator in which the layer or layers whose absorption coefficient can be modulated by an electric field is doped or implanted with ions acting as efficient recombination sites for photogenerated electrons and holes. The layer may be doped or implanted with ions that make it semi-insulating.

an electroabsorption modulator with Fe-doping within the layer or layers whose absorption coefficient can be modulated by an electric field.

an electroabsorption modulator wherein instead of a PiN junction the device comprises one or more NPi(semi-insulating)PN or preferably Ni(semi-insulating)N structures.

a semiconductor photoconductive emitter, photodiode or transducer in which the optically absorbing region is doped or implanted with ions making it semi-insulating.

a semiconductor Mach-Zehnder modulator in which the core layer (whose refractive index can be modulated by an electric field) is doped or implanted with ions making it semi-insulating.

a photonic integrated device comprising one or more of the devices described in GB 0502108.4 and PCT/GB2006/000360.

use of the described device to emit or detect radiation in the frequency range 80 GHz to 2 THz.

Figure 3:
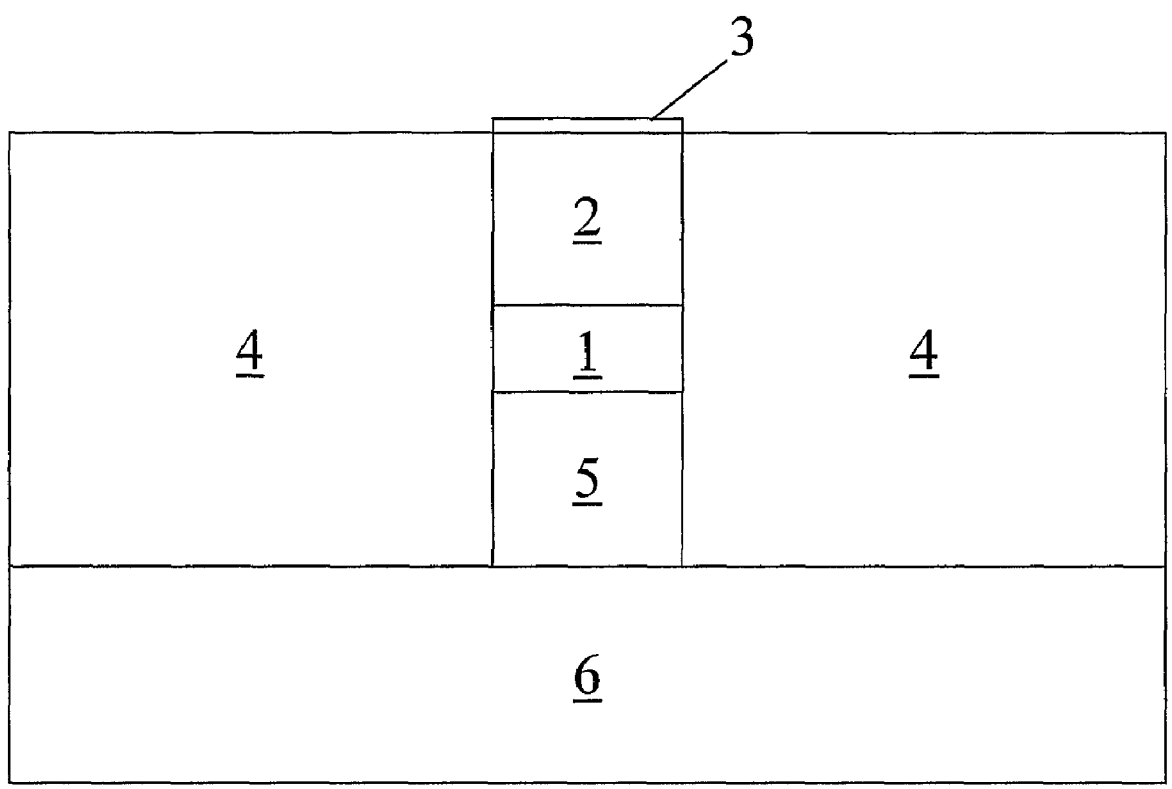
FIG. 3 is a schematic cross section in a plane perpendicular to the direction of optical propagation through an electroabsorption modulator structure according to an embodiment of the invention.

Referring to FIG. 3, in GB 0502108.4 and PCT/GB2006/000360 a new structure of high-speed EAM (electroabsorption modulator) is proposed with different material compositions in the absorber and upper contact region to overcome at least some of the limitations of the prior art. Instead of a PiN junction, as is typically used in known devices. A device according to GB 0502108.4 and PCT/GB2006/000360 comprises NPi(Fe)PN or preferably Ni(Fe-doped)N structures. Other deep level acceptor dopants or implanted ions likely to give semi-insulating performance could be used instead of or as well as Fe.

The dominant term in the chip serial resistance is that associated with the p-contact layer; nInP has ~5% of the resistivity of pInP for the same doping levels. Incorporating Fe into the depletion region reduces the leakage current of the otherwise leaky NiN junction.

Fe in the depletion region will act as a non-radiative recombination site to reduce the photo-generated carrier lifetime, thus reducing optical saturation effects. Fe in the depletion region will reduce the responsivity (=photocurrent/optical input power) of the EAM, permitting higher input optical powers before thermal runaway occurs.

A schematic cross-section of a device according to a preferred embodiment of the invention of GB 0502108.4 and PCT/GB2006/000360 is shown in FIG. 3. Layer 1 is called the 'absorption layer' and has a higher refractive index than the surrounding layers and thus can be used to guide light along the device. It may be composed of either bulk semiconductor or, preferably, a multiple quantum well, preferably with InGaAs wells and InAlAs barriers. Layer 1 may be doped with a deep level acceptor such as Fe to a concentration of around $8\times10^{17}$ cm$^{-3}$.

Layers 2 and 5 are n-doped layers of semiconductor material, preferably InP. An intermediate bandgap layer may optionally be inserted between these layers and layer 1. Layer 3 is a metallic contact layer and layer 4 is a current blocking region, which can be composed of semi-insulating material such as Fe-doped InP or a dielectric material depending on whether the device is a buried heterostructure or ridge waveguide, respectively. Layer 6 is n-doped semiconductor which may be located upon either an n-doped or semi-insulating substrate (not shown) depending on whether the other metallic contact (not shown) is located on the underside or top of the chip respectively.

In summary, in GB 0502108.4 and PCT/GB2006/000360, an electroabsorption modulator comprises an absorption layer 1 between two layers of n-doped semiconductor 2, 5. The absorption layer 1 is doped or implanted with Fe ions making it semi-insulating. The use of an NiN structure rather than a PiN structure significantly reduces the series resistance of the device. The Fe-doping of the absorption layer reduces the leakage current of the NiN structure and provides recombination sites for photo-generated electron-hole pairs.

The invention claimed is:

1. A detector for electromagnetic radiation in the range 80 GHz to 4 THz, the detector comprising:
   a laser light source;
   an optical modulator arranged to modulate light from the laser light source; and
   a filter system for selecting a defined range of frequencies of the modulated light,
   wherein the optical modulator comprises an electroabsorption modulator, characterised in that
   the laser light source is a continuous wave laser light source, and
   the optical modulator comprises an antenna which is sensitive to electromagnetic radiation in the range 80 GHz to 4 THz, and the signal received by the antenna modulates the electric field across the electroabsorption modulator, whereby to modulate the light from the laser light source.

2. A detector as claimed in claim 1, wherein the selected range of frequencies corresponds to a sideband of the laser light frequency in the spectrum of the modulated light.

3. A detector as claimed in claim 1, wherein the selected range of frequencies is defined only by an upper or lower limit.

4. A detector as claimed in claim 1, wherein the filter system comprises an optical filter.

5. A detector as claimed in claim 1 further comprising a second laser source of a different frequency to the first laser source which is mixed with the modulated light from the first laser source to generate a beat frequency.

6. A detector as claimed in claim 5, wherein the filter system comprises at least one photodiode to convert an optical signal at the beat frequency to an electrical signal and an electrical filter to select the electrical signal at the beat frequency.

* * * * *